No. 667,732. Patented Feb. 12, 1901.
P. OFTEDAHL.
HANDLE BAR.
(Application filed Apr. 28, 1900.)
(No Model.)
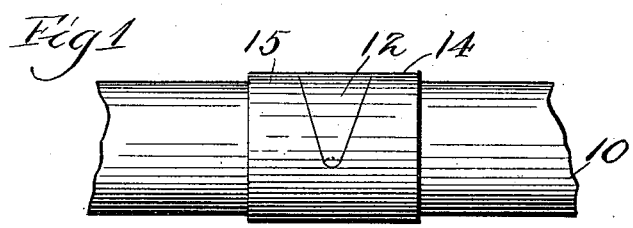
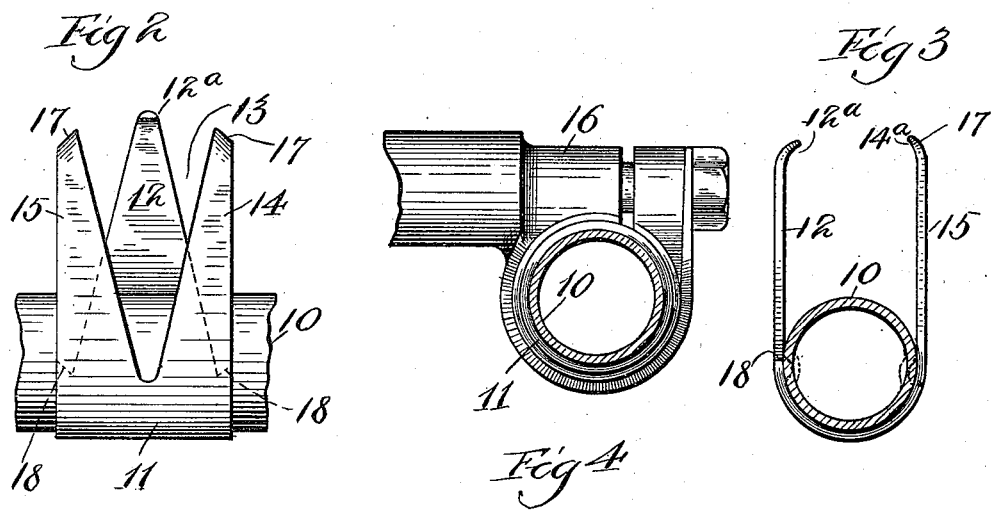
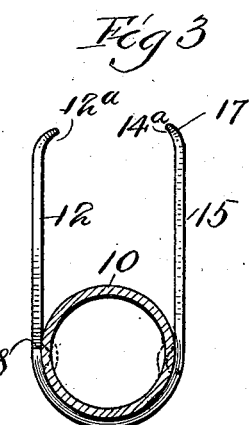
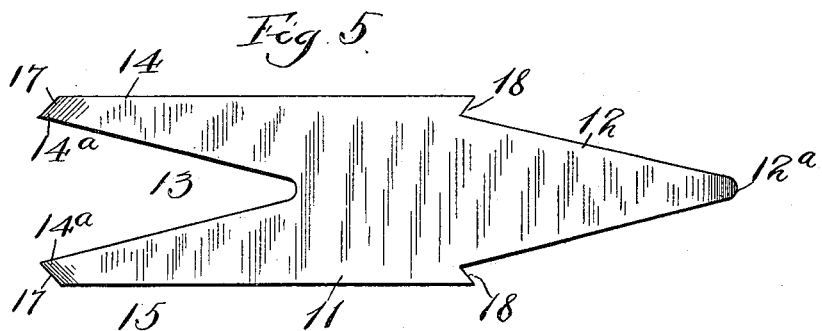
Witnesses
W. C. Corlies
Wm. Geiger
Inventor
Peter Oftedahl
By Louis K. Gillson
Atty.

UNITED STATES PATENT OFFICE.

PETER OFTEDAHL, OF CHICAGO, ILLINOIS, ASSIGNOR TO THE CHICAGO HANDLE BAR COMPANY, OF ILLINOIS.

HANDLE-BAR.

SPECIFICATION forming part of Letters Patent No. 667,732, dated February 12, 1901.

Application filed April 28, 1900. Serial No. 14,732. (No model.)

*To all whom it may concern:*

Be it known that I, PETER OFTEDAHL, a citizen of the United States, and a resident of Chicago, county of Cook, and State of Illinois, have invented certain new and useful Improvements in Handle-Bars, of which the following is a specification and which are illustrated in the accompanying drawings, forming a part thereof.

This invention relates to that type of one-piece handle-bars in which the bar is held by an encircling clamp, a ferrule being formed upon the bar for the engagement of the clamp.

The object of the invention is to improve the construction of such bars, particularly with reference to the application thereof of the ferrule; and it consists in a bar having a ferrule secured thereupon, such ferrule having its ends abutting and matched together by indentations.

In the accompanying drawings, Figure 1 is a detail elevation of the bar and the ferrule. Fig. 2 is a similar view, the blank of which the ferrule is formed being only partially folded around the bar. Fig. 3 is a transverse section of the bar, the ferrule-blank being shown in the same position as in Fig. 2. Fig. 4 is a transverse section of the bar, showing the clamp in elevation; and Fig. 5 is a plan view of the blank of which the ferrule is formed.

Heretofore it has been the common practice to form ferrules for handle-bars of a piece of strap metal having straight or squared ends, the two ends exactly meeting when the ferrule is folded about the bar and being brazed together. It has been practically impossible in this form of construction to unite the ends of the strap of which the ferrule is formed without having them rise slightly from the bar in consequence of the heat of the metal, thereby forming a ridge or rib entirely across the ferrule. Inasmuch as the ferrule in this type of handle-bar must be necessarily a true circle, so as to admit of the rotation of the bar within the clamp when the latter is loosened for the purpose of adjustment, it has been necessary to turn down the ferrule or otherwise remove the rib formed in the manner above described. The formation of this rib has been due to the fact that when the ends of the ferrule are squared there is a very considerable quantity of metal acting under the influence of the heat to lift the strap ends away from the bar.

In the construction forming the subject of this application the handle-bar 10 is of the usual tubular form, and the ferrule 11 encircles it so as to simply increase its diameter without changing its circular form. The ferrule is provided at one end with a tenon 12, which is preferably V-shaped and at the other end with a recess or mortise 13 correspondingly shaped, the cutting of this mortise leaving a pair of projecting fingers 14 and 15, one at each side of the strap, the mortise and tenons being of sufficient length to reach at least half-way around the bar. Preferably the ends of the tenon 12 and fingers 14 and 15 are bent inwardly, as shown at 12ª 14ª, so that when the ferrule is compressed upon the bar these inturned tips will sink into it sufficiently to prevent movement, even though the ferrule should not fit so tightly as to bind it securely in place or be anchored by the brazing.

The outer ends of the fingers 14 and 15 should be chamfered slightly at the outer edge, as shown at 17, and at the base of the tenon 12 there should be formed a corresponding recess to receive the tips of the fingers, as shown at 18. By this means the finger ends are held against lateral deflection as the ferrule is compressed upon the bar.

In applying the ferrule to the bar it is first given the U form shown in Figs. 2 and 3, and then its tenon and fingers are folded downward tightly against the bar, and so that they interlock. The length of the strap being exactly equal to the circumference of the bar, it will be seen that the strap ends will exactly meet when so folded down. While held in this position and heated, spelter is applied to the tenon 12 and instantly follows along the joint to its base. It would be impossible for any part of the strap end to rise under the influence of the heat except the extreme tips of the tenon and the fingers, and there is so little metal adjacent to these tips that its expanding force is not sufficient to raise their ends, and consequently the operation of attaching the ferrule is complete with the application of the spelter, and no subsequent dressing other than buffing is necessary in order to secure a smooth surface. The tenons and fingers are preferably brazed together in any event, though the brazing is not essential when the bar is indented by the inturned ends of tenon and fingers, as the oppositely-directed points 12$^a$ and 14$^a$ serve to hold the ferrule securely, especially as it is always under compression by the clamp 16 when in service. If desired, the bar may be indented by a special operation to receive the inturned tips, though in practice and with the use of proper tools for compressing the ferrule this is not necessary.

While I have shown and greatly prefer the strap as having but a single mortise and tenon, it is obvious that it might be provided with more.

The clamp 16 is simply shown for the purpose of clearness, but has no bearing upon the invention.

I claim as my invention—

1. A ferrule for bicycle handle-bars and the like, being a strap for encircling the bar and having interfolding matched fingers or tenons, the length of which is as great as one-half of the circumference of the bar to which the ferrule is to be applied.

2. In a bicycle handle-bar, in combination, a bar, and a strap-ferrule encircling the bar, the ends of the strap meeting and having intermeshing pointed tenons, the tips of the tenons being inturned so that they will indent the bar when the ferrule is compressed thereupon.

3. In a bicycle handle-bar, in combination, a bar and a strap-ferrule encircling the bar, the ends of the strap meeting and having intermeshing tenons extending not less than half around the bar, the meeting edges of the tenons being brazed together.

PETER OFTEDAHL.

Witnesses:
LOUIS K. GILLSON,
I. A. HELMICH.